United States Patent [19]
Wiener

[11] Patent Number: 5,256,468
[45] Date of Patent: Oct. 26, 1993

[54] SMART SKIN ARRAY WOVEN FIBER OPTIC RIBBON AND ARRAYS AND PACKAGING THEREOF

[75] Inventor: Patricia Wiener, La Honda, Calif.

[73] Assignee: Page Automated Telecommunications Systems, Inc., Palo Alto, Calif.

[21] Appl. No.: 671,582

[22] Filed: Mar. 19, 1991

[51] Int. Cl.⁵ .................. B32B 5/08; D03D 5/00; D03D 25/00

[52] U.S. Cl. .................. 428/193; 139/408; 139/420 R; 362/32; 385/128; 385/147; 428/192; 428/226; 428/229; 428/245; 428/257; 428/258; 428/259; 428/260; 428/262; 428/265; 428/297; 428/302; 428/408; 428/902

[58] Field of Search .................. 362/32; 385/128, 147; 139/420 R, 408; 428/903, 258, 257, 224, 259, 260, 226, 192, 229, 245, 262, 265, 297, 302, 408, 902

[56] References Cited

U.S. PATENT DOCUMENTS

| | | | |
|---|---|---|---|
| 4,234,907 | 11/1980 | Daniel | 362/32 |
| 4,466,697 | 8/1984 | Daniel | 385/128 |
| 4,772,092 | 9/1988 | Hofer et al. | 385/147 |
| 4,885,663 | 12/1989 | Parker | 362/32 |
| 5,021,928 | 6/1991 | Daniel | 362/32 |

Primary Examiner—George F. Lesmes
Assistant Examiner—James D. Withers
Attorney, Agent, or Firm—Townsend and Townsend Khourie and Crew

[57] ABSTRACT

A woven material is described in which optical fibers are positioned and held in the material in a manner to maximize their optical efficiency. The material consists of fibers extending in both the warp and woof direction, the optical fibers are positioned in channels between the supporting fibers in the warp direction. The material is manufactured using conventional weaving equipment by positioning both the optical fibers and the warp fibers, and then weaving the woof fibers into place without bending the optical fibers. The fibers are thusly woven so that the optical fibers have zero warp. The woven grid-like mat can be coated with a protective material that either enables it to form a flexible sheet of ribbon or a rigid, hard, grid-like mat which has aligned zero warp optical fibers embedded therein. The material shown can be used to provide sensing, imaging or communications. It can be utilized for optical backplanes for optoelectronic systems or a housing for optoelectronic components.

10 Claims, 5 Drawing Sheets

SMART SKIN ARRAY WOVEN FIBER OPTIC RIBBON AND ARRAYS AND PACKAGING THEREOF

BACKGROUND OF THE INVENTION

This invention relates to optical systems and optical fibers, and particularly to optical fibers woven into other material to provide sensors or "smart" skins for aircraft and other applications.

Fiber optic sensor technology has become increasingly desirable for monitoring for numerous applications such as aircraft and spacecraft. The size, weight, communications density, immunity to interference, and ruggedness, are pushing fiber optic technology into more and more applications.

A recent concept in the manufacture of aircraft and spacecraft has been the employment of fiber optics within the skin of the craft itself, thereby creating a "smart" skin which enables sensors embedded into the composite material to convey information about the aircraft or spacecraft throughout the craft without need for separate communications links and their associated disadvantages.

The mechanical properties of cloth woven from glass fibers are reasonably well known. Such material provides desirable mechanical properties including high tensile strength, flexibility, resistance to weather as well as chemicals, high tear strength, dimensional stability, and abrasion resistance.

It is also known that individual optical fibers can be used to transmit optical signals throughout the length of the fiber and have very high bandwidths. Individual optical fibers have excellent optical properties, but are very fragile. A variety of techniques have been developed to hold individual fibers in a manner to prevent damage to them. For example, they are frequently encased in cables or other protective material. In addition, individual fibers can be grouped together to provide cables capable of carrying increased amounts of information.

One technique widely used for protection of optical fibers is to encapsulate them in an epoxy material to provide rigidity and strength. For example, U.S. Pat. No. 4,547,040 describes an optical fiber assembly where optical fibers are held in an embedding material.

Individual optical fibers have also been woven into sheets. For example, U.S. Pat. No. 4,907,132 describes a device where optical fibers are woven into a panel. The fibers are positioned in the warp direction of the weave. Where the fibers cross the woof fibers, the coating is removed so that the fibers emit light. In this manner, a panel made from the fibers emits light. U.S. Pat. No. 4,885,663 shows woven optical fibers where the bends in the fibers where they cross the woof provide discontinuities for the emission of light. The purpose of this structure is provide a light-emitting panel.

Other prior art such as U.S. Pat. Nos. 4,952,020 and 4,468,089 show optical fibers which are encapsulated in various ways to form cable assemblies such as described above. Unfortunately, cable assemblies such as described in these patents are relatively expensive and cannot be used to form sheet-like structures.

Many papers have been written on the application of optical fibers to the formation of "smart" skins for aircraft or spacecraft. In "Fiber Optic Skin and Structural Sensors," by Eric Udd, *Industrial Metrology* 1 (1990) 3-18, the use of optical fibers in a skin-like material for use as sensors is described. The paper, however, describes the fibers as being merely embedded in a structural material. Embedding the fibers in that manner suffers from the disadvantages discussed in the paper discussed below.

In a paper entitled, "Smart Skins and Fiber-optic Sensors Application and Issues," Kausar Talat, Boeing Defense & Space Group, Seattle, Washington (unpublished), describes material with embedded optical fibers where the physical properties of the fiber itself were used as a sensor. The composite described in this article includes optical fibers disposed inside a laminated structure. At the end of the structure, the optical fibers pass through a tube inserted to prevent micro-bending of the fiber where it exists from between the laminated sheets. As described in the article, the laminated structure causes the fibers to kink during curing, creating losses as well as having other disadvantages discussed in the paper.

SUMMARY OF THE INVENTION

The present invention provides a structure which solves many of the alignment problems present in the above-described prior art. According to the technique of this invention, the optical fibers are woven into a supporting material in channels therein. The optical fibers are positioned to have zero warp and be without cross-overs or micro-bends.

According to the present invention, optical fibers are positioned and held in a grid-like mat woven from fibers of a supporting material. This supporting material can consist of any desired material providing the requisite properties, for example, fiberglass, graphite, etc. The supporting fibers are used for both the warp and woof fibers for the structure. During manufacture, one or more optical fibers are positioned in channels between the supporting fibers in the warp direction. Each channel can have a large number of optical fibers.

The material is woven so that the optical fibers have zero warp, that is, they have no bends. This enables the optical fibers to operate with maximum transmission efficiency. Once complete, the woven grid-like mat can be coated with protective material such as rubber epoxy to form a flexible sheet with zero warp optical fibers embedded within it. Alternatively, the material can be coated or embedded in a rigid material, such as epoxy, to form a hard or rigid grid-like material.

The material fabricated according to this invention has many applications and can be used to provide sensing, imaging, and communications. For example, the material is suitable for communication of sensing information on the surface of an aircraft or spacecraft.

In a preferred embodiment of the invention, the woven structure includes a plurality of first strands positioned in a warp direction and a plurality of second strands positioned in a woof direction, the second strands being woven with the first strands. The optical fibers are positioned in the structure between selected pairs of the first strands in a manner such that the optical fibers have zero warp.

In another embodiment of the invention, an optoelectronic packaging structure includes two portions. In both portions a plurality of first strands are positioned in a warp direction and a plurality of second strands are positioned in a woof direction, interwoven with the first strands. In only a first portion of the structure, however, are a plurality of optical fibers woven into the structure in a manner such that they have zero warp and extend in channels defined by the first strands. The optical fibers extend from the first portion of the structure and connect to components affixed to the second portion of the structure, and/or to other structures in or out of the plane of the original weave.

DESCRIPTION OF THE SPECIFIC EMBODIMENT

Figure 1:
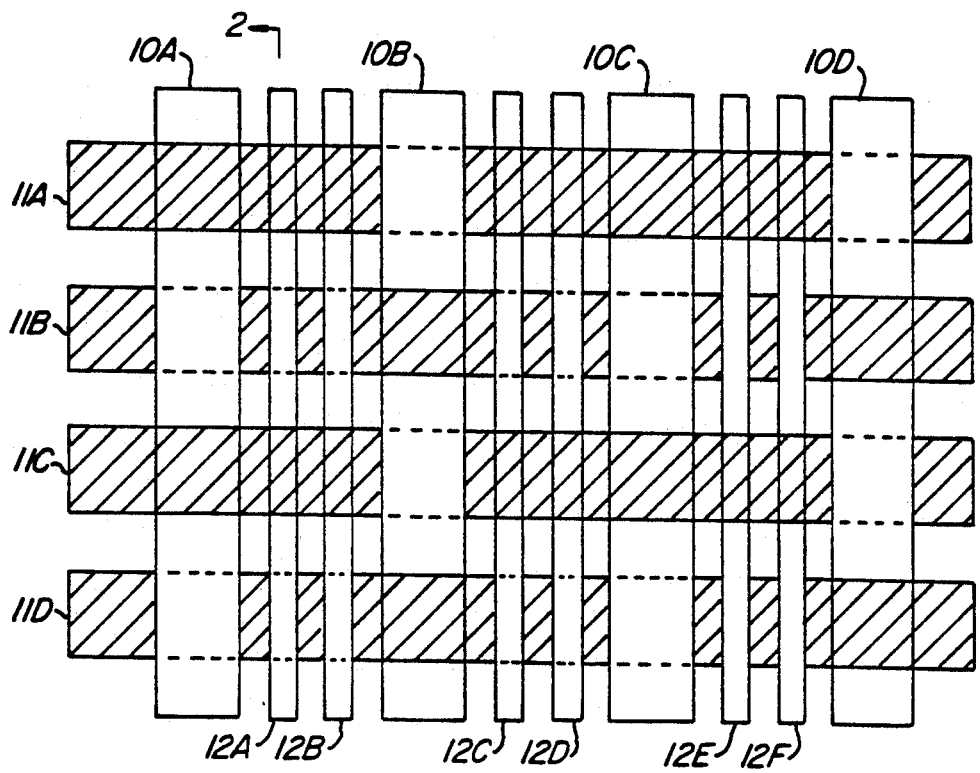
FIG. 1 is a plan view of material having both woven support fibers and optical fibers.

FIG. 1 is a plan view of a preferred embodiment of material fabricated according to the invention. As illustrated, the material is woven with warp strands 10A, 10B, 10C, 10D, and woof (or pick) strands 11A, 11B, 11C and 11D. The warp and woof strands are woven together into a fabric-like material using a normal over-and-under plain weave pattern. The warp and woof strands may employ any desired material having the physical properties desired for the application. For example, the strands can comprise fiberglass, graphite, silica carbide, or other materials. An example of a silica carbide fiber suitable for application is sold by Dow-Corning Corporation under the trademark Nicalon ™.

Introduced with the supporting fibers before the weaving are optical fibers 12A, 12B, 12C, 12D, 12E and 12F. Importantly, the optical fibers are introduced into the material to run in the warp direction with a zero warp. That is, the optical fibers have no bending or crimping. The absence of bends or crimps provides maximum optical efficiency and provides repeatability of signals regardless of their transmission position within the woven material. It is well known that when signals are transmitted through optical fibers, losses occur wherever bending or kinking of the fiber is present. The structure shown in FIG. 1 includes a pair of optical fibers in the channel between each non-optical warp strand 10A, . . . 10D. Of course, more or fewer optical fibers may be employed.

Figure 2:
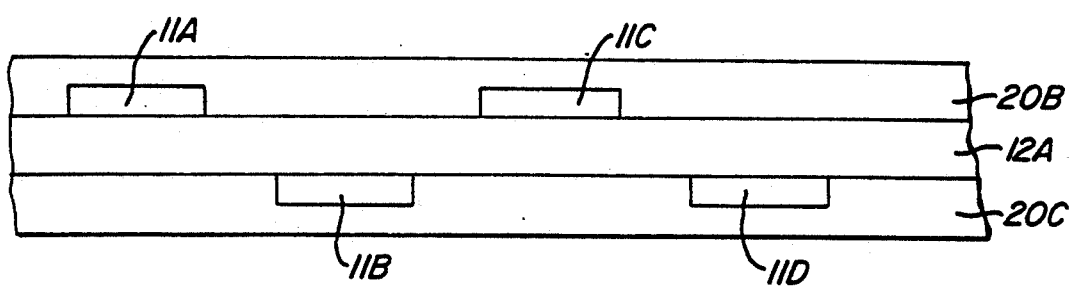
FIG. 2 is a cross-sectional view of the material shown in FIG. 1.

FIG. 2 is a cross-sectional view of material such as depicted in FIG. 1, but which has also been coated with a protective coating material to hold all fibers in place. FIG. 2 can be considered to be a cross-sectional view of the structure shown in FIG. 1 taken along the length of fiber 12A. As shown in FIG. 2, the optical fiber 12A extends across the figure with woof strands 11A, 11B, 11C and 11D extending over and under the optical fiber. A coating 20 consisting of a well known material such as rubber, epoxy, or other suitable material, holds the optical fibers in position with respect to the surrounding material.

Figure 3:
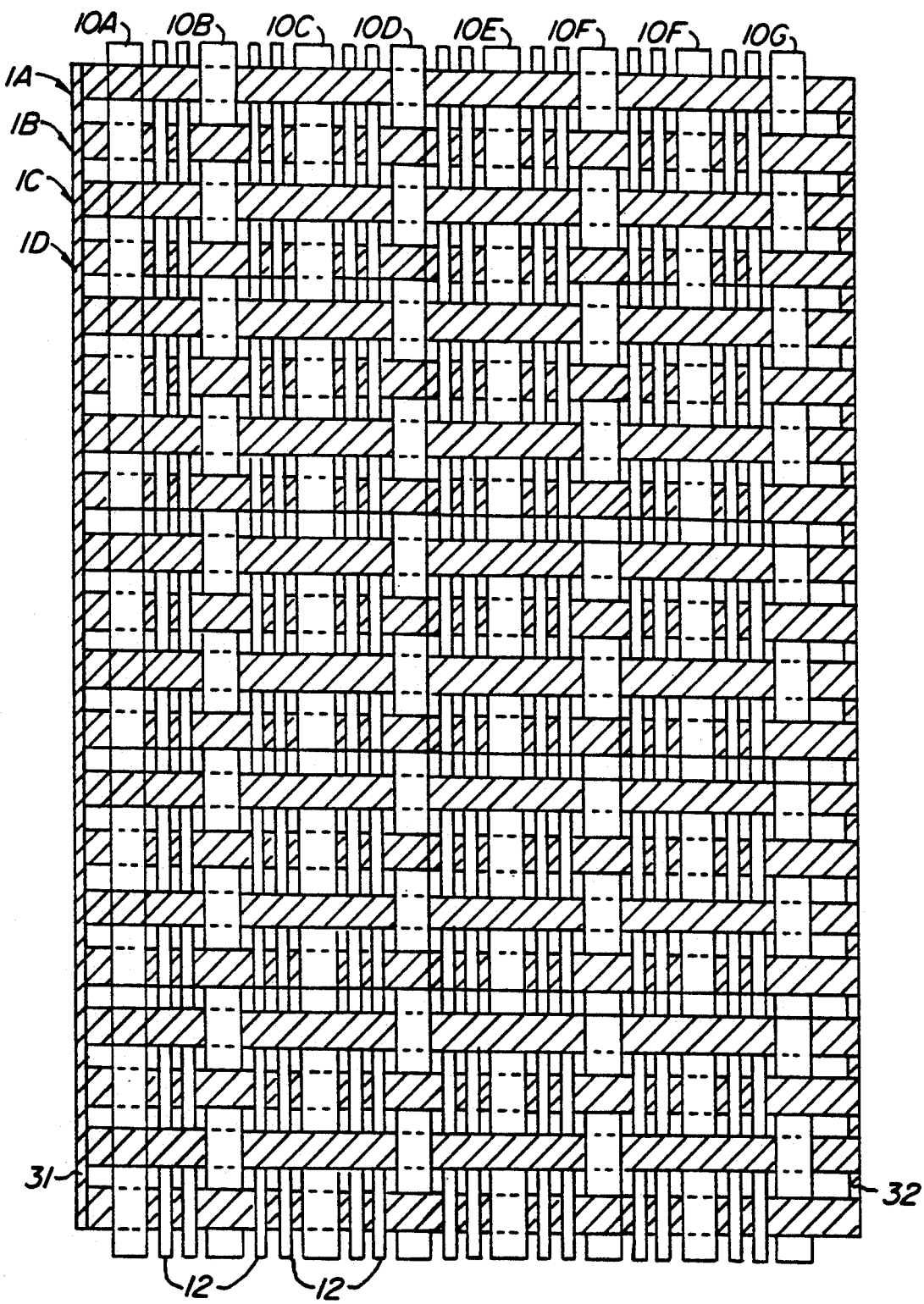
FIG. 3 illustrates a larger section of woven material and termination of two edges of material.

FIG. 3 depicts a larger region of material woven according to the preferred embodiment to illustrate the manner in which the woof strands are bound at the edges of the material As shown in FIG. 3, the optical fibers 12 extend from the top of the figure to the bottom, while the woof strands extend across the figure from left to right. Also extending from the top of the figure to the bottom are the warp strands discussed above in conjunction with FIG. 1 The edges of the woof strands 11 are bound by a conventional technique using leno material 31 and 32. Of course, other techniques may also be employed to secure the edges of the fabric, for example by knotting them together.

For the embodiment depicted in FIG. 3, silica carbide fibers such as those described above are employed, which have a dimension of 1800 denier and are woven with a density of 44 optical fibers per inch. The density of the weave is defined both by the diameter of the optical fiber, the surrounding material and the width of the teeth of the comb, and is variable as necessary depending upon the application.

The optical fibers embodied in the fabric depicted in FIG. 3 are commercially-available optical fibers such as graded index GE-doped silica fibers manufactured by Corning or single mode silica fibers, etc. In one embodiment Corning fibers with an numerical aperture of 0.22, a core of 125 microns with an overall diameter of 250 microns and an 85° C. temperature rating are employed. Using fibers such as these in a material as described results in about 44 fibers per lineal inch across the material. The length of the material is dependent on the length of the roll of material used, and very long rolls of material, exceeding a kilometer in length, can be fabricated using existing commercially-available weaving equipment with adequate tension control methods applied. The optical fibers can be positioned, and the surrounding material woven, using conventional textile weaving equipment. For example, a composite generation facility with standard weaving equipment can be employed. Preferably, a comb will be employed in addition to the standard weaving equipment to position the optical fibers. The comb can be in the form of a small-toothed comb installed at the front end of the weaving equipment Such a comb provides a reproducible number of fiber optic strands between the strands of the intervening material and assures a nonoverlapping condition with unbent optical fiber. Although various commercial machines will require different adjustments, during one test of the weaving operation, a change in tension occurred when the weaving spinner rollers ran out of fiber. This change in tension can cause breakage of the optical fiber, and accordingly the importance of controlling proper tension by suitable monitoring and maintenance of full rollers is believed to be important. In the prior art and presently, optical fibers were laid out manually in composite plies in specific orientation. Misalignment of the optical fiber orientation results in significant losses. In the techniques described herein, the laying out of the fiber is achieved automatically in the normal weaving process. Reducing such losses provides for a uniformity and repeatability that lends itself to accurate and diverse modality sensing and simple interconnect processes. One of the most important issues is sensor network integration within the structure. This invention successfully addresses this issue as it relates to major systems.

For the embodiment depicted in FIG. 3, two optical fiber yarns are placed in the channel between each of the warp strands. It should be understood, however, that any desired number of optical fibers can be placed between each of the warp strands. For example, in one embodiment each channel contains eight optical fibers. Other embodiments are discussed below.

Once the material has been woven with the optical fibers in position, the assembly may be coated with a desired material to give added protection to the structure. As described in conjunction with FIG. 2, by applying a coating to the woven grid-like mat, the position of the fibers in the plane of the grid-like mat is fixed, and the material is provided with additional rigidity. Preferably, the curing material can be applied by brushing it onto the woven sheet, by passing the woven sheet through a bath of curing material, or by employing other conventional application techniques.

In one embodiment of the invention, the rigid coating was made using a curing fluid made from the EPON 828 epoxy, manufactured by Shell Chemical Company, mixed with a fixing agent of diethylene-triamine in a ratio of 88% epoxy and 12% fixing agent by volume. In other embodiments where a flexible material is desired, commercial grade rubber cement has been employed.

Figure 4:
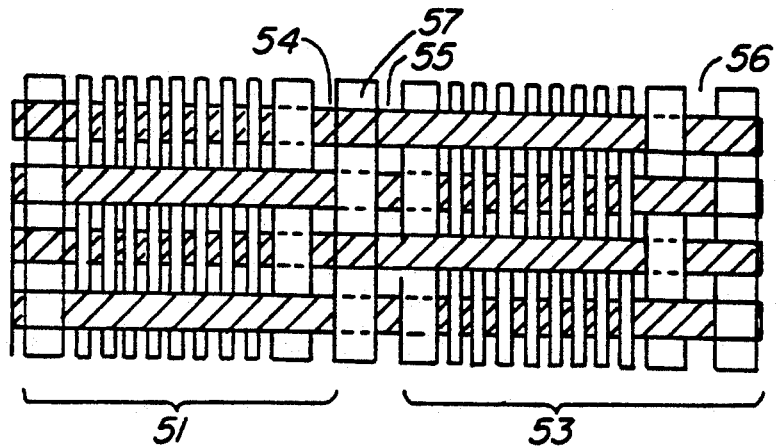
FIG. 4 illustrates another embodiment of the invention in which a parallel weave of separable optical fiber ribbons of one type are woven with other material and can be separated into individual ribbons.

FIG. 4 illustrates another embodiment of the invention as ribbons of material. As shown there, the material is divided into two sections, 51 and 53. These sections are separated by additional longitudinal leno filaments 54 and 55, and an extra support fiber 57. The leno filaments 54 and 55 provide a convenient place where the optic grid can be separated into individual ribbons, provide a convenient marker for identifying particular fibers, as well as preventing the material from unraveling. Of course, any desired number of sections can be used in the material. In this manner, a large loom can be used to weave in parallel widths of like or varied materials later divided into sections for various uses.

Figure 5:
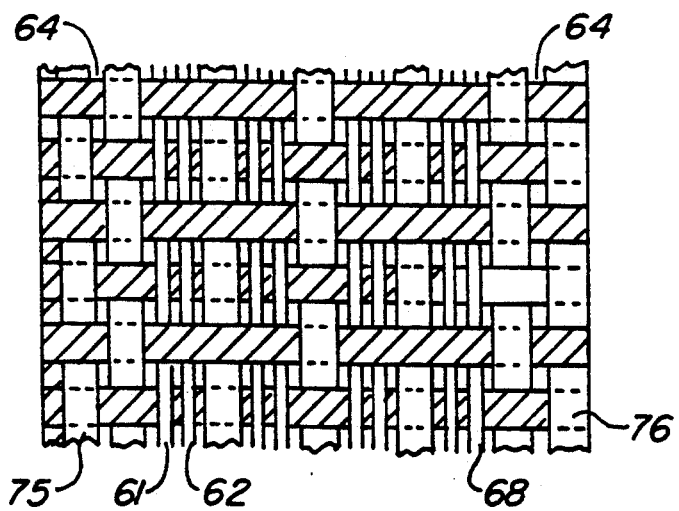
FIG. 5 illustrates another embodiment of the invention showing fiber optic ribbons having a plurality of two fiber optic strands per ribbon.

FIG. 5 depicts another embodiment of the invention in which eight optical fibers 61, 62, ... 68 are positioned in pairs between two support fibers. Lenos 64 with associated extra support fibers 75 and 76 are provided to enable one strip of material to be fabricated with a number of sections and then divided into separate pieces if desired.

Figure 6:
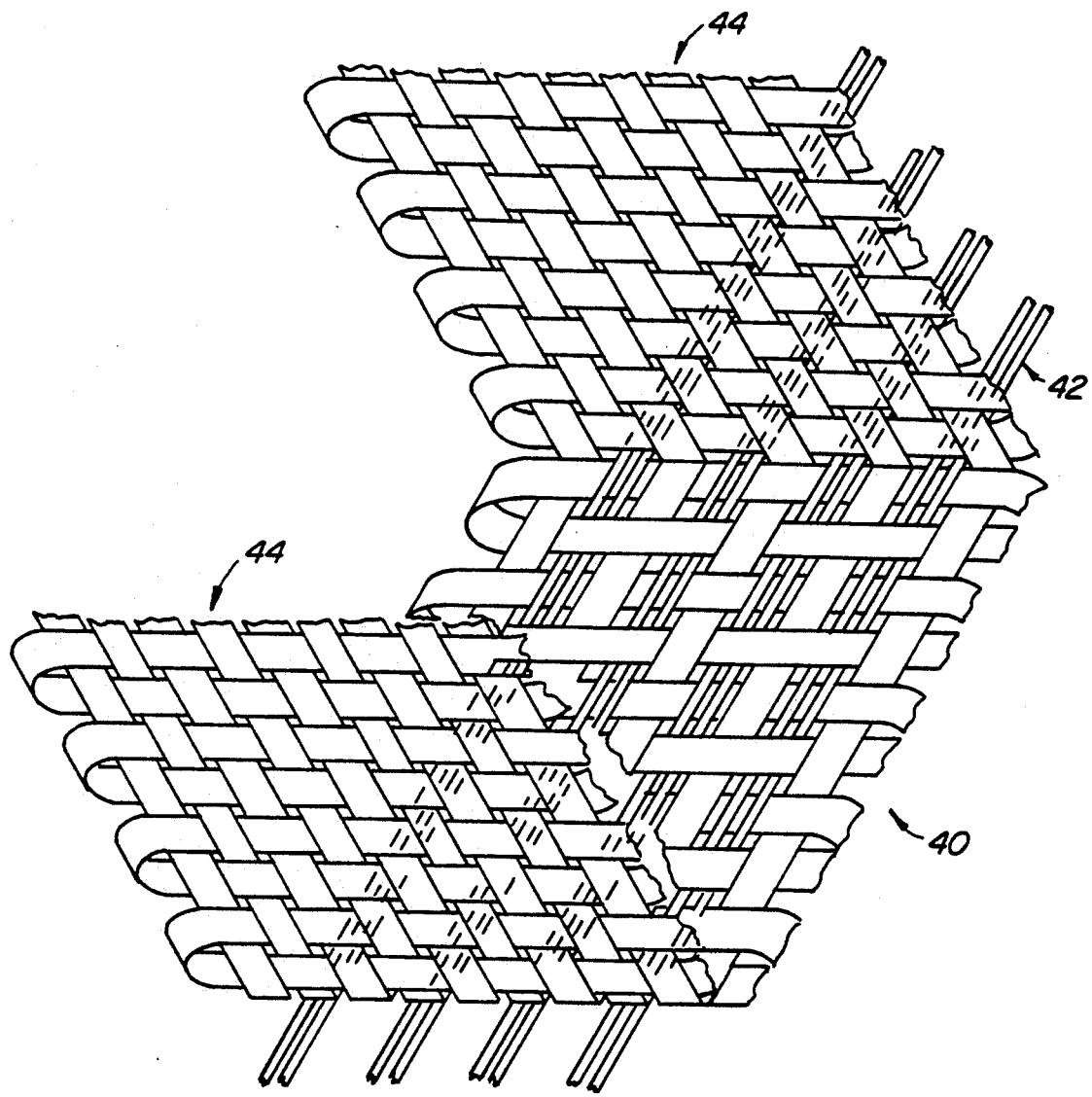
FIG. 6 illustrates a three-dimensional packaging structure.

FIG. 6 illustrates a three-dimensional woven structure suitable for various packaging considerations. As shown, the structure includes a woven backplane 40 with fiber optic conductors 42 and two woven planes 44 approximately perpendicular to the backplane. This structure can be used to support printed circuit boards and/or wafers which interface to the fiber optics in the backplane. This section could be at various angles relative to the backplane. It is suggested that sharp angles be avoided. All sections moving out of the plane should be rounded at an angle no less than the specified radius in the optical fiber data sheets. This avoids undue stress at sharp edges of the supporting material. Coatings applied to the material can supply additional stress relief.

Figure 7:
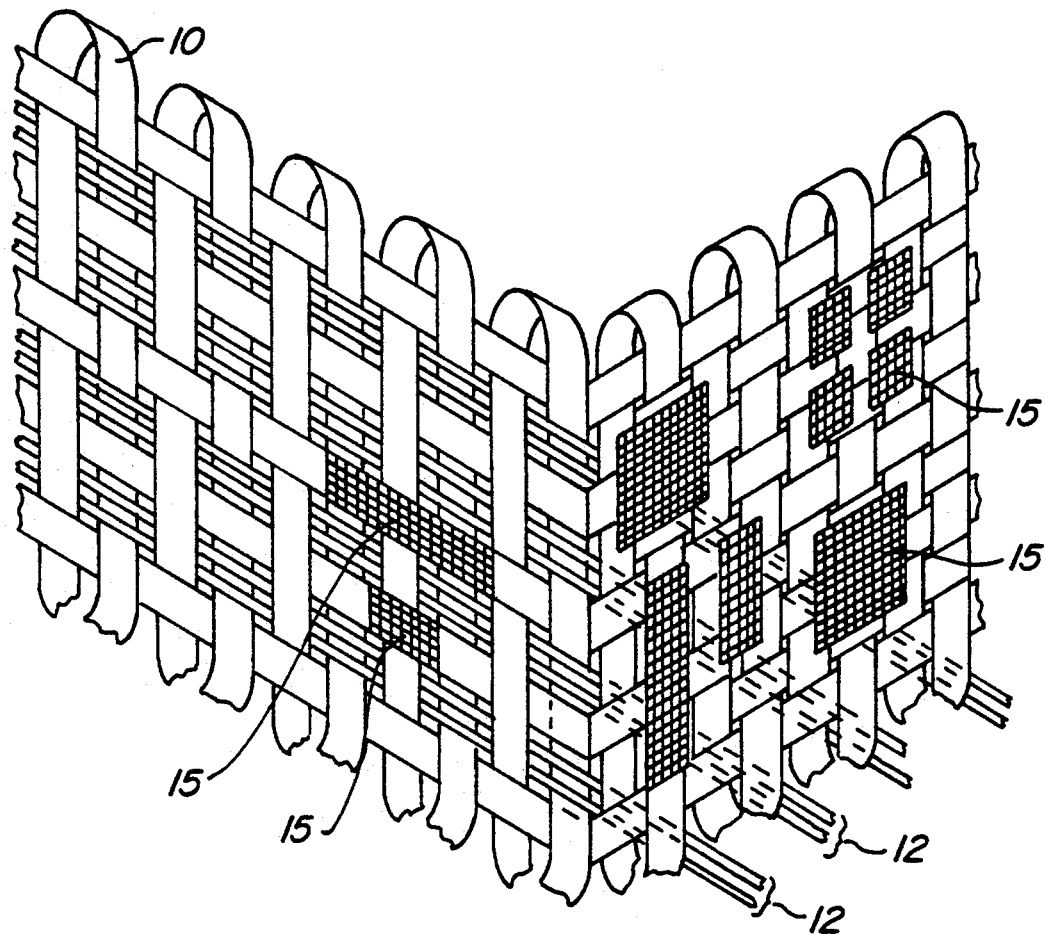
FIG. 7 illustrates another application of the invention in which the optical fibers extend beyond the material to permit easier interconnection.

FIG. 7 is a perspective view illustrating how the material shown in FIGS. 1, 2 and 3 may be fabricated into a three-dimensional structure. For the structure depicted in FIG. 7, the optical fibers 12 extend beyond one edge of the woven material to facilitate optical connections. As also shown in FIG. 7, the warp fibers 10 are woven through the material in a continuous fashion. By extending the material beyond the area where the optical fibers are woven into the mat, an additional area of supporting material provides a structure for mounting other components 15. Of course, components 15 may also be mounted proximate to the optical fibers to enable connections at that location as well. Components 15 will typically comprise electronic, optical or electrooptical components. As one example, an optical detector integrated circuit can be mounted on the woven cloth mat, and appropriate connections made to surrounding integrated circuits using wire bonding, flexible printed circuit connections, or other well known techniques. Of course, circuits can be mounted on either or both sides of the material.

Before or after mounting the circuits, depending upon the particular application, the structure shown in FIG. 7 can be coated with an appropriate material to hold it in a rigid position or to allow it to flex.

As shown in FIG. 7, the material of this invention provides a structure which facilitates various packaging techniques for circuits. With the structure depicted, the optical fibers are held in a precise location facilitating connection to other integrated circuits or other optical elements Similarly, by extending the woven material beyond the circuit substrate portion, a convenient, inexpensive, integrated technique for mounting circuit elements for connection to the optical fibers is provided. Of course, sensors may be connected to individual fibers or groups of fibers to provide large arrays of sensors. In addition, the optical fibers themselves can be used as sensing elements to provide a smart skin array. Examples of such applications of "smart" skin arrays are described in the two technical papers referred to above. The "smart" skin can provide fiber optic sensing arrays in the skin of airplanes. It can be used to fabricate low cost, high speed communications for computer networks. For example, the material can be employed as an optoelectronic backplane for large scale, high performance computer systems, such as parallel processors.

The material of the invention also provides a structure for transmission and reception of laser-generated optical signals in conjunction with packaging and interconnecting components. Such embodiments can be used to provide high speed data buses to interconnect components in a high performance computer system. Of course, the use of large numbers of optical fibers provides an ease in constructing systems wherein redundant means for transmission of information is desired as well as for multichannel information transfers.

Although the foregoing invention has been shown and described with respect to preferred embodiments, it will be understood that many alternative embodiments can employ the techniques described here. Accordingly, the scope of the invention is set forth by the following claims.

I claim:

1. A woven structure comprising:
   a plurality of first strands positioned in a warp direction in the structure;
   a plurality of second strands positioned in a woof direction in the structure, the second strands being woven with the first strands; and
   a plurality of optical fibers positioned with zero warp in channels in the structure, the channels being defined by the first strands.

2. A structure as in claim 1 wherein:
   adjoining pairs of the first strands define channels in the structure; and
   at least one optical fiber is positioned in each channel.

3. A structure as in claim 2 wherein:
a pair of optical fibers is positioned in each channel.

4. A structure as in claim 1 wherein the woven structure has an upper and a lower surface, and further comprising:
   a coating of encapsulation material disposed over both the upper and lower surfaces to secure the first and second strands and the optical fibers in place.

5. A structure as in claim 4 wherein the encapsulation material forms a rigid structure.

6. A structure as in claim 5 wherein the encapsulation material comprises an epoxy.

7. A structure as in claim 4 wherein the encapsulation material forms a flexible structure.

8. A structure as in claim 7 wherein the encapsulation material comprises a form of rubberized cement.

9. A structure as in claim 1 wherein at least one of the first and second strands comprises a material chosen from the group consisting of fiber glass, graphite, and silica carbide.

10. A structure as in claim 1 further comprising a leno disposed along at least one edge of the structure to prevent unraveling of that edge.

* * * * *